(12) United States Patent
Schmid

(10) Patent No.: US 7,347,783 B2
(45) Date of Patent: Mar. 25, 2008

(54) DRIVESHAFT AND METHOD OF MANUFACTURING SUCH A DRIVESHAFT

(75) Inventor: Reiner Schmid, Bingen/Hochberg (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 256 days.

(21) Appl. No.: 11/098,165

(22) Filed: Apr. 4, 2005

(65) Prior Publication Data

US 2005/0250587 A1    Nov. 10, 2005

(30) Foreign Application Priority Data

May 6, 2004    (DE)   ............ 10 2004 022 476

(51) Int. Cl.
*F16D 3/76* (2006.01)
(52) U.S. Cl. ........................................ 464/91
(58) Field of Classification Search ............... 464/72, 464/89, 91, 90; 403/225
See application file for complete search history.

(56) References Cited

U.S. PATENT DOCUMENTS

| | | | | |
|---|---|---|---|---|
| 2,231,037 A | * | 2/1941 | Taylor | ............ 464/91 X |
| 2,620,165 A | * | 12/1952 | Crickmer | ............ 464/91 X |
| 2,880,599 A | * | 4/1959 | Hlinsky | ............ 464/89 |
| 2,900,809 A | * | 8/1959 | Crankshaw | ............ 464/89 |
| 3,304,747 A | | 2/1967 | Eldenburg | |
| 4,353,586 A | * | 10/1982 | Raquet et al. | |

FOREIGN PATENT DOCUMENTS

| DE | 1 044 637 | 12/1954 |
|---|---|---|
| DE | 922 502 | 1/1955 |
| DE | 101 51 714 | 4/2003 |
| GB | 459 105 | 1/1937 |

\* cited by examiner

*Primary Examiner*—Greg Binda
(74) *Attorney, Agent, or Firm*—Klaus J. Bach

(57) ABSTRACT

In a drive shaft including an outer tube extending from one end and a core shaft extending from the other end at least partially into the outer tube and an elastomer damping element disposed between the outer tube and the core shaft and being vulcanized to the outer tube and the core shaft for the transmission of a torque therebetween, several support rings are disposed in axially spaced relationship between the outer tube and the core shaft and abut the outer tube and the core shaft so as to permit relative movement between the outer tube and the core shaft but prevent bending of the drive shaft.

15 Claims, 2 Drawing Sheets

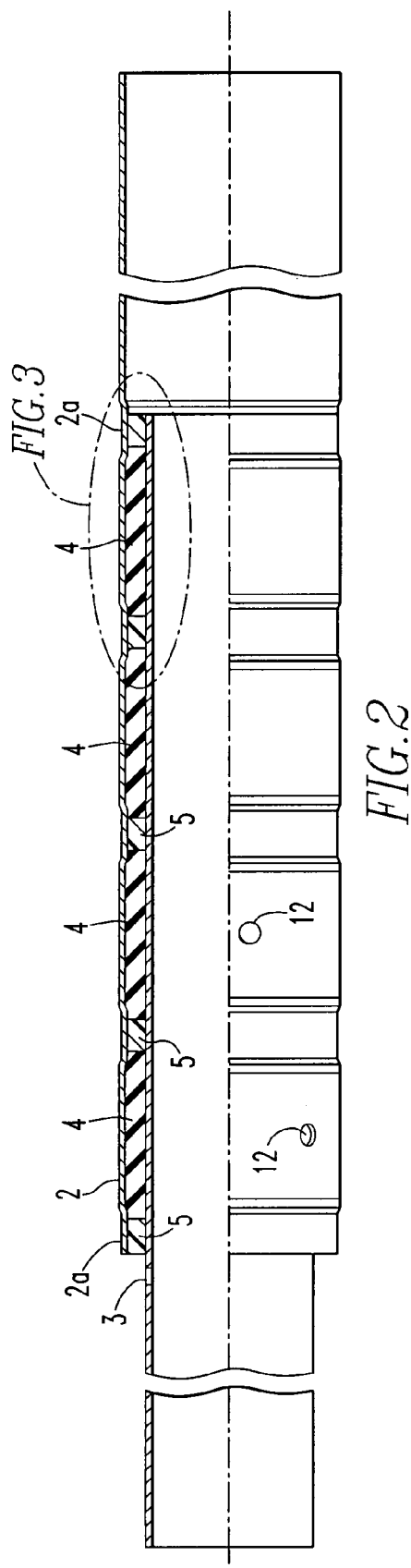
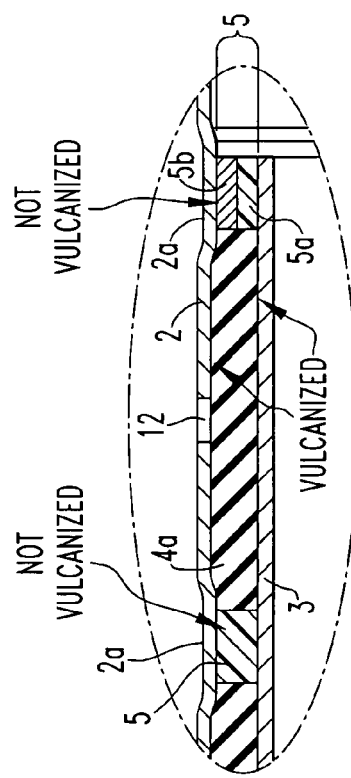

DRIVESHAFT AND METHOD OF MANUFACTURING SUCH A DRIVESHAFT

BACKGROUND OF THE INVENTION

The invention resides in a drive shaft with an outer tube extending from one end of the driveshaft and a core shaft which extends from the other end and is at least partially inserted into the outer tube of the drive shaft and with an elastomer damping element which is disposed between the outer tube and the core shaft and is vulcanized to the inner surface of the outer tube and to the outer surface of the core shaft.

Motor vehicles include drive lines with drive shafts for the transmission of the drive torque from the engine or the transmission to the rear axle differential of the motor vehicle. For damping torsion vibrations in the drive line usually damping elements are provided in the drive shaft, which consist of an elastomer damping material.

DE 101 51 714 A1 discloses a driveshaft which comprises an outer tube connected to one end of the shaft and a core shaft inserted at least partially into the outer tube and connected to the other end of the shaft and an elastomer damping element. The elastomer damping element is disposed between the outer tube and the core shaft and is vulcanized to the inside of the outer tube and also to the outside of the core shaft.

DE 922 502 further discloses a driveshaft which also comprises a hollow shaft and a core shaft disposed in the hollow shaft and an elastic element, which is disposed between the two shafts and which may consist for example of rubber. The elastic element may be vulcanized between the two shafts. It is furthermore indicated that, for increasing the bending resistance of the shaft, the elastic elements of rubber may be provided with annular metal inserts which however are not described in details.

Another drive shaft wherein a core shaft is inserted into an outer tube and an elastomer damping element is provided between the two is described in GB 459 105.

Finally, DAS 1 044 637 discloses a drive shaft wherein a core shaft is centrally disposed over its full length in a hollow shaft. Between the outside of the hollow shaft and a sleeve which extends around the hollow shaft and is connected to the core shaft at its insertion end, an elastic damping element is provided which is connected on one hand with the hollow shaft and on the other hand with the sleeve. By centering the core shaft in the hollow shaft bending vibrations are said to be prevented.

It is the object of the present invention to provide a drive shaft which includes a damping element for damping torsional vibrations and which is insensitive to bending vibrations and to a method manufacturing such a drive shaft.

SUMMARY OF THE INVENTION

In a drive shaft including an outer tube extending from one end and a core shaft extending from the other end at least partially into the outer tube and an elastomer damping element disposed between the outer tube and the core shaft and being vulcanized to the outer tube and the core shaft for the transmission of a torque therebetween, several support rings are disposed in axially spaced relationship between the outer tube and the core shaft and abut the outer tube and the core shaft so as to permit relative movement between the outer tube and the core shaft but prevent bending of the drive shaft.

With these support rings, bending of the drive shaft is reduced and, as a result, bending vibrations are prevented. The drive shaft according to the invention is of a very simple design, it is durable and also space saving.

Preferably, the support rings are arranged without play between the outer wall and the core shaft.

In a preferred embodiment of the drive shaft according to invention the support rings are firmly connected to the core shaft and loosely engage the inside wall of the outer tube.

Preferably, the support rings are arranged at predetermined axial distances and elastomer damping elements arranged in the spaces between adjacent support rings.

Preferably, the elastomer damping elements extend about the adjacent support rings without play.

Expediently, the elastomer damping elements are vulcanized to the inner surface of the outer tube and to the outer surface of the core shaft but not to the side walls of the adjacent support rings.

The support rings preferably consist all of a material capable of sliding.

In a preferred embodiment of the invention, the support rings consist of a plastic material. With the use of plastic material for the support rings noise transmission between the outer tube and the core shaft is inhibited. The support rings expediently consist of polyamide or PPS (polyphenylene sulfide) wherein PPS is used preferably for high temperature applications.

In another embodiment of the invention, the support rings consist of a metal. With support rings of metal, the desired dimensions can be obtained more accurately so that the dimensional tolerances can be improved for an improved capability of adjusting the tolerances.

In still another embodiment of the invention, the support rings may be compound rings of plastic and metal. If the support rings are compound rings of plastic and metal the noise-uncoupling of plastic material and the dimensional accuracy of metal are combined in an advantageous manner.

In this case, the support rings may be in the form of compound rings with an inner part of plastic which is in contact with the outside of the core shaft and an outer part which consists of metal and which is in contact with the inner surface of the outer tube.

In a preferred embodiment of the drive shaft according to the invention, the plastic material forming the support ring is molded onto the core shaft by injection molding.

In another preferred embodiment of the drive shaft according to the invention, the outer tube is adapted to the support rings where the support rings are in contact with the outer tube by circumferentially engaging the outer tube in the contact areas of the outer tube with the support rings.

The elastomer damping element consists preferably of silicon rubber.

Expediently, the outer tube is provided with several bores for the injection of a flowable elastomer damping element into the spaces between the core shaft and the outer tube and for venting those spaces during the injection of the elastomer.

Preferably, axially adjacent bores are displaced relative to one another in a circumferential direction.

The invention is furthermore directed to a method for the manufacture of such a drive shaft. In accordance with the method according to the invention, the core shaft is mounted on a machining apparatus, the support rings are placed onto the core shaft, the core shaft, with support rings mounted thereon, is introduced into the outer tube and a flowable elastomer is injected into the spaces between the core shaft and the outer tube for forming the elastomer damping elements. It is an important advantage of the method according to the invention that the drive shaft which dampens torsional vibrations and, at the same time, is insensitive to bending vibrations can be manufactured in a simple manner. It is particularly advantageous that the support rings provide for centering of the core shaft in the outer tube without the need for special measures.

Preferably, for forming the elastomer damping elements, the flowable elastomer is injected into the outer tube via bores formed in the outer tube.

In another advantageous embodiment, the support rings are formed onto the core shaft by injection molding. The support rings may be circumferentially cut so as to be dimensioned for an accurate fit in the outer tube. The outer tube may be swaged circumferentially in the areas where it is in contact with the support rings so that the outer tube is firmly engaged with the support rings and the core shaft is accurately centered in the outer tube. However, the circumferential swaging may be omitted if tubes with particularly small tolerances are available.

Below the invention will be described in greater detail on the basis of the accompanying drawings.

BRIEF DESCRIPTION OF THE DRAWINGS

FIG. 2 shows a part of the drive shaft according to the invention with a core shaft partially inserted into the outer tube and an elastomer damper element disposed between the core shaft and the outer tube, and FIG. 3 is an enlarged sectional view of the area X of FIG. 2 for an explanation of a detail.

DESCRIPTION OF A PREFERRED EMBODIMENT

Figure 1:
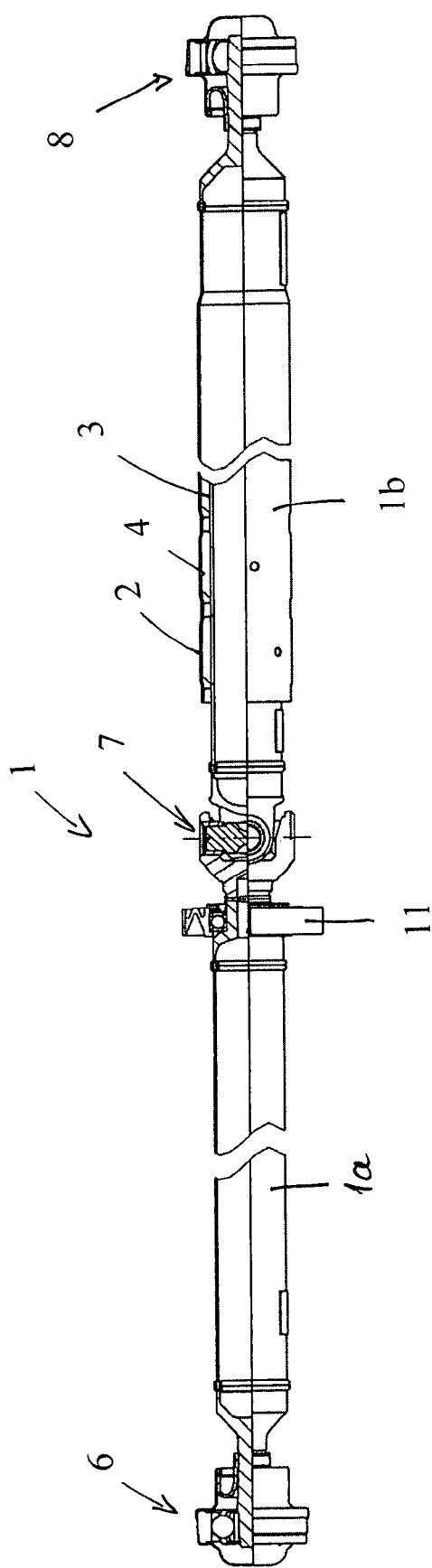
FIG. 1 is a side view of a drive shaft in accordance with one embodiment of the invention.

FIG. 1 shows, in a side view, a practical embodiment of a drive shaft of the invention as it could be used in the drive line of an automotive vehicle. The drive shaft designated generally by the numeral 1 includes three joints 6, 7, 8 of which the two outer joints 6, 8 are used to connect the drive shaft to adjacent components such as the output shaft of a transmission bolted to an internal combustion engine or a differential axle drive. Another joint 7, that is a universal joint, is arranged within the drive shaft 1 to permit an angling of the drive shaft. The joints 6, 8 are constant velocity joints which permit axial displacements for accommodating variable shaft lengths. Changes of the distance between the two outer joints 6, 8 for example by movements of the engine/transmission and the rear axle differential can be accommodated. A second part 1a of the drive shaft, which is disposed between one (6) of the outer joints 6, 8 and the inner joint 7 is fixed by means of a support bearing 11 for example on the vehicle frame or the vehicle body. A first part 1b of the drive shaft 1 is supported between the inner joint 7 and the other outer joint 8.

The first part 1b of the drive shaft 1 comprises an outer tube 2 connected to the drive shaft at the outer joint 8 and an inner tube or, as generally called, a core shaft 3, which is connected to the other end of the first part 1b of the drive shaft 1, that is, the inner joint 7.

Between the outer tube 2 and the core shaft 3, there is a damping element 4 which consists of an elastomer material and dampens torsion vibrations in the drive line in which the drive shaft is disposed. The elastomer damping element is vulcanized to the outside of the core shaft 3 as well as to the inside of the outer tube 2. Relative movements of the drive shaft parts caused by torque changes are cushioned by the damping element 4.

FIGS. 2 and 3 show the part of the drive shaft 1 including the damping element 4 in greater detail.

As shown in FIG. 2, in addition to the damping element 4, several support rings 5 are provided between the outer tube 2 and the core shaft 3 which abut the inner surface of the outer tube 2 as well as the outer surface of the core shaft 3. The support rings 5 are arranged between the outer tube 2 and the core shaft 3 without play and are firmly connected to the core shaft 3 but are in contact with the outer tube 2 so as to be movable relative thereto and form therewith a kind of friction bearing. As a result, the support rings 5 permit relative movement between the outer tube 2 and the core shaft 3 in circumferential direction whereas, in bending direction of the drive shaft 1, or respectively more accurately expressed of the first part 1b, in which the elastomer damping element 4 is disposed, provide for a form-locking connection between the outer tube 2 and the core shaft 3.

As shown in FIG. 2, the support rings 5 are arranged between the core shaft 3 and the outer tube 2 at predetermined axial distances so that between adjacent support rings 5 part areas 4a are formed in which the elastomer damping elements are disposed. The part areas 4a of the elastomer elements 4 are vulcanized to the inner surface of the outer tube 2 and the outer surface of the core shaft 3 but not to the sides of the adjacent support rings 5 with which they are however in contact without play.

As further shown in FIG. 2 and particularly in the enlarged detail view of FIG. 3, the outer tube 2 has, in the engagement areas 2a with the support rings 5, a diameter which has been reduced by circumferential swaging of the outer tube so that the support rings 5 are in close contact with the outer tube areas 2a even if the outer tube is not manufactured at high precision. If the outer tubes are manufactured from a material with little tolerances the desired close contact effect can also be achieved without swaging of the tube 2 in the ring contact areas 2a.

The support rings 5 consist of a slidable material, of plastic, particularly of a polyamide, PPS (polyphenyl sulfide), or of metal or another suitable material.

The support rings 5 may consist of a single material as shown for the support ring 5 at the left side of FIG. 3 or they may be compound rings as shown on the right side of FIG. 3. In this case, the support ring 5 is a compound structure of a plastic material and a metal and comprises an inner pad 5a which is in contact with the outer surface of the core shaft 3 and which consists of plastic and an outer part 5b which is in contact with the inner surface of the outer tube 2 and consists of metal. The plastic material provides for noise damping between the core shaft 3 and the outer tube 2 whereas the metal of high precision and wear-resistance serves as the support structure between the support ring 5 and the outer tube 2.

As further shown in FIG. 2 bores 12 are provided circumferentially in the outer tube 2 for the injection of a flowable elastomer for the establishment of the elastomer damping element 4 and for the venting of the area into which the elastomer is injected.

The damping element 4 can be introduced between the outer tube 2 and the core shaft 3 in the conventional way, however, the following procedure is particularly advantageous. First the core shaft 3 is supported in a suitable apparatus; then the support rings 5 are mounted onto the core shaft 3, the core shaft 3 is inserted, together with the support rings 5, into the outer tube 2 and finally a flowable elastomer is injected through the bores 12 into the spaces between the core shaft 3 and the outer tube 2 for forming therein the elastomer damping element 4. Bores 12 disposed in axial direction next to one another are circumferentially displaced relative to one another.

The support rings 5 are preferably molded directly onto the core shaft 3 by injection molding. The rings 5 can then be machined while being disposed on the core shaft 3 to bring them to an accurate diameter size. Also, the side walls of the rings 5 can be cut to size as necessary.

The elastomer damping element 4 or, respectively, the part areas 4*a* thereof are to be vulcanized to the outer tube 2 and to the core shaft 3, however, not to the side walls of the support rings 5 so that no inadmissibly large shear stresses occur between the elastomer material of the damping element 4 and the side walls of the support rings, particularly not at the transition between the support ring 5 and the outer tube 2 where the support ring 5 is slidably engaged with the outer tube 2. To this end, the support rings 5 could be provided at their side surfaces with a coating which prevents vulcanization or the support rings 5 may consist of a material to which the elastomer material of the damping element 4 cannot be vulcanized.

The material of the elastomer damping element 4 may be a suitable elastomer such as silicon caoutchouc. But another caoutchouc or rubber may be used.

The connecting element between the outer tube 2 and the core shaft 3 formed by the elastomer damping element 4, and the support rings 5 is, in the shown embodiment, arranged as close as possible to the joint 7 but sufficiently spaced therefrom so that support devices can be provided for accommodating axial forces which occur when friction welding procedures are employed in the manufacture of the drive shaft.

In the drive shaft according to the invention, the damping element 4 is contained within the shaft tubes so that no larger construction space is required than the maximum diameter of the outer tube.

The temperature range in which such a drive shaft is operative is large, for example −60° C. to +180° C.

The drive shaft is balanced like conventional standard drive shafts.

What is claimed is:

1. A drive shaft having opposite ends and including an outer tube (2) extending from one end of the drive shaft and a core shaft (3) extending from the opposite end at least partially into the outer tube (2) so as to be enclosed therein,
    an elastomer damping element (4) disposed between the outer tube (2) and the core shaft (3) and being vulcanized to the inner surface of the outer tube (2) and to the outer surface of the core shaft (3), and
    several support rings (5) disposed in axially spaced relationship between the outer tube (2) and the core shaft (3) which abut the outer tube (2) and the core shaft (3) and are closely engaged therebetween so as to permit relative movement between the outer tube (2) and the core shaft (3) in a circumferential direction but prevent any radial movement therebetween, the support rings (5) consisting of an inner part (5*a*) of plastic which is disposed on the outer surface of the core shaft (3) and an outer part (5*b*) of metal which abuts the inner surface of the outer tube (2) and accommodates the slide movements.

2. A drive shaft according to claim 1, wherein the support rings (5) are arranged at predetermined axial distances from one another and in the spaces between adjacent support rings (5) partial areas (4*a*) of the elastomer damping element (4) are disposed.

3. A drive shaft according to claim 2, wherein the partial areas (4*a*) off the damping element (4) are, in axial direction, in play free contact with the adjacent support rings (5).

4. A drive shaft according to claim 2, wherein the partial areas (4*a*) of the damping element (4) are, to the inner surface of the outer tube (2) and to the outer surface of the core shaft (3) but not to the side surfaces of the adjacent support rings (5).

5. A drive shaft according to claim 1, wherein the plastic material in the support rings (5) consist of one of polyamide and PPS (polyphenylene sulfide).

6. A drive shaft according to claim 1, wherein the outer tube (2) is brought into abutting engagement with the support rings (5) by circumferential swaging of the outer tube (2) in the area of the support rings (5).

7. A drive shaft having opposite ends and including an outer tube (2) extending from one end of the drive shaft and a core shaft (3) extending from the opposite end at least partially into the outer tube (2) so as to be enclosed therein,
    an elastomer damping element (4) disposed between the outer tube (2) and the core shaft (3) and being vulcanized to the inner surface of the outer tube (2) and to the outer surface of the core shaft (3), and
    several support rings (5) disposed in axially spaced relationship between the outer tube (2) and the core shaft (3) which abut the outer tube (2) and the core shaft (3) and are closely engaged therebetween so as to permit relative movement between the outer tube (2) and the core shaft (3) in a circumferential direction but prevent any radial movement therebetween, the support rings (5) consisting of plastic which is molded onto the core shaft (3) by injection molding.

8. A drive shaft according to claim 7, wherein the support rings (5) are firmly connected to the core shaft (3) but abut the inner surface of the outer tube (2) so as to permit the relative movement therebetween.

9. A drive shaft according to claim 7, wherein the support rings (5) are arranged at predetermined axial distances from one another and in the spaces between adjacent support rings (5) partial areas (4*a*) of the elastomer damping element (4) are disposed.

10. A drive shaft according to claim 7, wherein the partial areas (4*a*) of the damping element (4) are, in axial direction, in play free contact with the adjacent support tinge (5).

11. A drive shaft according to claim 9, wherein the partial areas (4*a*) of the elastomer damping element (4) are vulcanized to the inner surface of the outer tube (2) and to the outer surface of the core shaft (3) but not to the side surfaces of the adjacent support rings (5).

12. A drive shaft according to claim 7, wherein the plastic material in the support rings (5) consist of one of polyamide and PPS (polyphenylene sulfide).

13. A drive shaft according to claim 7, wherein the outer tube (2) is brought into abutting engagement with the support rings (5) by circumferential swaging of the outer tube (2) in the area of the support rings (5).

14. A drive shaft having opposite ends and including an outer tube (2) extending from one end of the drive shaft and a core shaft (3) extending from the opposite end at least partially into the outer tube (2) so as to be enclosed therein,
    an elastomer damping element (4) disposed between the outer tube (2) and the core shaft (3) and being vulcanized to the inner surface of the outer tube (2) and to the outer surface of the core shaft (3), and several support rings (5) disposed in axially spaced relationship between the outer tube (2) and the core shaft (3) which abut the outer tube (2) and the core shaft (3) and are closely engaged therebetween so as to permit relative movement between the outer tube (2) and the core shaft (3) in a circumferential direction but prevent any radial movement therebetween, the outer tube (2) including several bores (12) for the injection of a flowable elastomer into the spaces between the core shaft (3) and the outer tube (2) for forming therein the elastomer damping element (4) and also for the venting of those spaces during the injection of the elastomer.

15. A drive shaft according to claim 14, wherein bores (12) disposed in the axial direction of the drive shaft (1) adjacent one another are displaced circumferentially with respect to one another.

* * * * *